United States Patent [19]
Im

[11] Patent Number: 5,936,870
[45] Date of Patent: Aug. 10, 1999

[54] ARITHMETIC OPERATING DEVICE FOR DIGITAL SIGNAL PROCESSING AND METHOD THEREFOR

[75] Inventor: Jin Hyeock Im, Seoul, Rep. of Korea

[73] Assignee: LG Electronics Inc., Seoul, Rep. of Korea

[21] Appl. No.: 08/912,244

[22] Filed: Aug. 15, 1997

[30] Foreign Application Priority Data

Aug. 17, 1996 [KR] Rep. of Korea .................. 1996-34067

[51] Int. Cl.$^6$ ...................................................... G06F 7/38
[52] U.S. Cl. ...................................................... 364/745.03
[58] Field of Search .......................... 364/745.03, 748.04

[56] References Cited

U.S. PATENT DOCUMENTS 4,379,338  4/1983  Nishitani et al. .................. 364/745.03
5,251,166  10/1993  Ishida ................................. 364/745.03

*Primary Examiner*—David H. Malzahn

[57] ABSTRACT

An arithmetic operating device and method for a digital signal processing (DSP) having a fixed bit number of input/output data bits significantly decreases the time conventionally spent on buffering in a converter. The device includes a sign bit extender for increasing number of sign bits an input data DATA_IN, an adder for adding up the input data DATA_IN which passed through the sign bit extender and a feedback data DATA_ACC, an accumulator for accumulating a present output data and a previous output data from the adder, an overflow detector for detecting an overflow of the data DATA_ACC outputted from the accumulator in accordance with an extended sign bit therein, and a saturation logic unit for converting the number of sign bits in the data DATA_ACC outputted from the accumulator to an initial number of sign bits in the input data DATA_IN in accordance with a signal OF outputted from the overflow detector, wherein the accumulator outputs the data DATA_ACC to the adder while an arithmetic operation is proceeding therein, and the accumulator outputs the data DATA_ACC to the overflow detector and to the saturation logic unit when the entire arithmetic operation is completed.

9 Claims, 3 Drawing Sheets

ARITHMETIC OPERATING DEVICE FOR DIGITAL SIGNAL PROCESSING AND METHOD THEREFOR

BACKGROUND OF THE INVENTION

1. Field of the Invention

The present invention relates to a device for performing arithmetic operations of digital signal processing ("DSP") when provided with a fixed number of input/output data bits, and more particularly to an improved arithmetic operating device and method capable of enhancing a speed and accuracy thereof, wherein an overflowed data bit is employed during the arithmetic operation, and the overflowed data bit is eliminated upon completion of the arithmetic operation, for thereby carrying out a saturation only once on the basis of a resultant value of the arithmetic operation.

2. Description of the Prior Art

In a DSP algorithm, a multiplication and an accumulation are successively performed. Widely known DSP algorithms such as Finite Impulse Response Filter, Discrete Transform and Convolution, can be generalized as a summation operation, $\Sigma_i\, c_i f_i$. As indicated by the summation expression, a multiplication and an accumulation are carried out in consecutive steps.

During such an arithmetic operation, a resultant value in each step may exceed the size of a storage register, and this is called an overflow condition. When there occurs an overflow, there is carried out a saturation in which the data value that causes the overflow is replaced by the largest value within a plus (+) or minus (−) range of the overflowed value.

For example, assuming that the number of input/output data bits is 4, the MSB (most significant bit) is a sign bit, and fixed point arithmetic is adopted, and the numerical values which are to be expressed by the data bits range from −8 to +7, under such an assumption, when the binary values $0100_2$ and $0100_2$ are added up, there is obtained a binary value $1000_2$ which represents −8 instead of +8, so that the value $1000_2$ is converted to the largest value that is to be expressed within the fixed data size. That is, the value $1000_2$ is converted to $0111_2$ which is the largest positive value +7 capable of being expressed in the fixed data size.

FIG. 1 is a block diagram of an arithmetic operating device for a digital signal processing according to the conventional art. As shown therein, an adder 11 adds up an externally applied data DATA_IN and a feedback data DATA_OUT. An overflow detection unit 12 detects an overflow condition with regard to a data signal outputted from the adder 11. A saturation logic unit 13 saturates the data signal outputted from the adder 11 in accordance with a signal OF outputted from the overflow detection unit 12. An accumulator 14 accumulates a present output data signal and a previous output data signal which are outputted from the saturation logic unit 13, and the accumulated data DATA_OUT is externally outputted and at the same time fed back to the adder 11.

With reference to FIG. 2 illustrating a detailed circuit view of the saturation logic unit 13, as shown therein, a converter 21 receives the MSB (most significant bit) from the data outputted from the adder 11 and carries out a saturation. A multiplexer 22 selects and outputs one of the data outputted from the converter 21 and the data outputted from the adder 11, in accordance with the output signal OF from the overflow detection unit 12.

The thusly constituted conventional arithmetic device for a digital signal processing will now be described.

Assuming that each of the input/output data DATA_IN, DATA_OUT are four bits, the most significant bits therein each becomes a sign bit. Therefore, in the case of using a 2's complement system, an expressible number with regard to the data ranges from −8 to +7.

When the input data DATA_IN is $0100_2$, and the fed-back data DATA_OUT is $0100_2$, the adder 11 adds up the input data DATA_IN and the fed-back data DATA_OUT and outputs a resultant data $1000_2$. The overflow detection unit 12 compares the respective MSBs of the two data DATA_IN, DATA_OUT with the MSBs of the data outputted from the adder 11. That is, when the respective MSBs of the two data DATA_IN, DATA_OUT are equal, and the respective MSBs of the two data DATA_IN, DATA_OUT are not identical to those of the output data, it is determined that an overflow error has occurred, and if the respective MSBs of the two data DATA_IN, DATA_OUT are equal, and the respective MSBs of the two data DATA_IN, DATA_OUT are identical to those of the output data, it is determined that an overflow error did not occur.

Returning to the above example, the MSBs of the two data DATA_IN, DATA_OUT which are applied to the adder 11 are respectively "0", and to the contrary, the MSB of the output data $1000_2$ is "1", thereby resulting in an overflow. Accordingly, the overflow detection unit 12 outputs a high level output signal OF to the saturation logic unit 13.

When the output data AR having a value of $1000_2$ is applied to a second input terminal IN2 of multiplexer 22 of the saturation logic unit 13, the MSB "1" of the output data AR is inputted to the converter 21. Then, the converter 21 receives the MSB "1" and outputs a value of $0111_2$ which is contrary to that of the data AR applied to the first input terminal IN1 of the multiplexer 22.

That is to say, the inverter INV in the converter 21 inverts the MSB "1" to "0". The buffer BUF receives the MSB "1" and outputs the remaining three bits except for the MSB "0" in the form of "1", thereby incurring a time delay.

The multiplexer 22 receives $0111_2$ through its first input terminal IN1 and $1000_2$ through its second input terminal IN2.

Because the output signal OF from the overflow detection unit 12 is at a high level, the multiplexer 22 selects and outputs the data $0111_2$ applied to its first input terminal IN1.

The accumulator 14 accumulates the output data $0111_2$ from the saturation logic unit 13 and the output data from the previous step, and the resulting output data DATA_OUT is externally outputted and at the same time fed back to the adder 11.

However, when there does not occur an overflow in the adder 11, that is, when the output data from the adder 11 is less than $1000_2$, the overflow detection unit 12 outputs the output signal OF at a low level, and accordingly the multiplexer 22 in the saturation logic unit 13 passes the output data of the adder 11.

As described above, each time an arithmetic operation is performed, an overflow is detected for and a saturation is carried out if necessary, so that if a hundred arithmetic operations need to be performed so as to obtain a final resultant value, a hundred overflow detections and saturations must also be performed.

Likewise, the disadvantages of the conventional art are that there must be carried out an overflow detection and a saturation for each arithmetic operation, and it takes a considerable time in the buffer BUF of the converter 21 during the saturation.

Further, due to a consecutive saturation during the arithmetic operation, the more frequent the saturation, the worse becomes the accuracy of the final output value.

In order to avoid a time delay caused by such a saturation, there may be employed a technique for increasing the bit numbers in the adder by predicting the overflow frequency.

For example, if it is assumed that an input value is 32 bits and that there may occur four overflows on a maximal basis, the bit number of the output value is determined as 34 bits, whereby a saturation is not required without regard to an overflow generation.

If such a conventional technique employed in a particular hardware for a multiplication and a accumulation, then it is not necessary to consider an overflow. It is notable that although the bit number is increased to 34, the actual speed increase is significantly small. However, when such a conventional technique is applied to a DSP device, the size of an external device such as a memory device may be undesirably increased.

SUMMARY OF THE INVENTION

Accordingly, it is an object of the present invention to provide an arithmetic operating device and method for digital signal processing (DSP) employing a fixed number of bits for input/output data, wherein an arithmetic operation is carried out without regard to an overflow by increasing the number of data bit in an adder, and when the arithmetic operation is completed, a saturation is carried out only once in accordance with the initially applied number of data bits, for thereby increasing the speed of the arithmetic operation.

To achieve the above-described object, an arithmetic operating device for digital signal processing (DSP) according to the present invention, wherein an input/output data bit number is fixed, includes a sign bit extender for increasing the number of sign bits of an input data DATA_IN, an adder for adding up the input data DATA_IN which passed through the sign bit extender and a feedback data DATA_ACC, an accumulator for accumulating a present output data and a previous output data from the adder, an overflow detector for detecting an overflow of the data DATA_ACC outputted from the accumulator in accordance with an extended sign bit therein, and a saturation logic unit for converting the number of sign bits in the data DATA_ACC outputted from the accumulator to the initial number of sign bits in the input data DATA_IN in accordance with a signal OF outputted from the overflow detector, whereby the accumulator outputs the data DATA_ACC to the adder when an arithmetic operation is on the process therein, and the accumulator outputs the data DATA_ACC to the overflow detector and to the saturation logic unit when the entire arithmetic operation is completed.

Further, to achieve the above-described object, an arithmetic operating method for digital signal processing (DSP) according to the present invention, wherein an input/output data bit number is fixed, includes a first step for increasing the number of sign bits of an input data, a second step for determining whether there occurred an overflow in accordance with a sign bit in a final output data when the arithmetic operation is completed, a third step for eliminating the number of sign bits increased in the first step from the output data when there does not occur an overflow, and a fourth step for saturating the output data when there occurs an overflow.

BRIEF DESCRIPTION OF THE DRAWINGS

The present invention will become more clearly understood with reference to the accompanying drawings which are given only by way of illustration and thus are not limitative of the present invention, wherein.

DETAILED DESCRIPTION OF THE INVENTION

Figure 1:
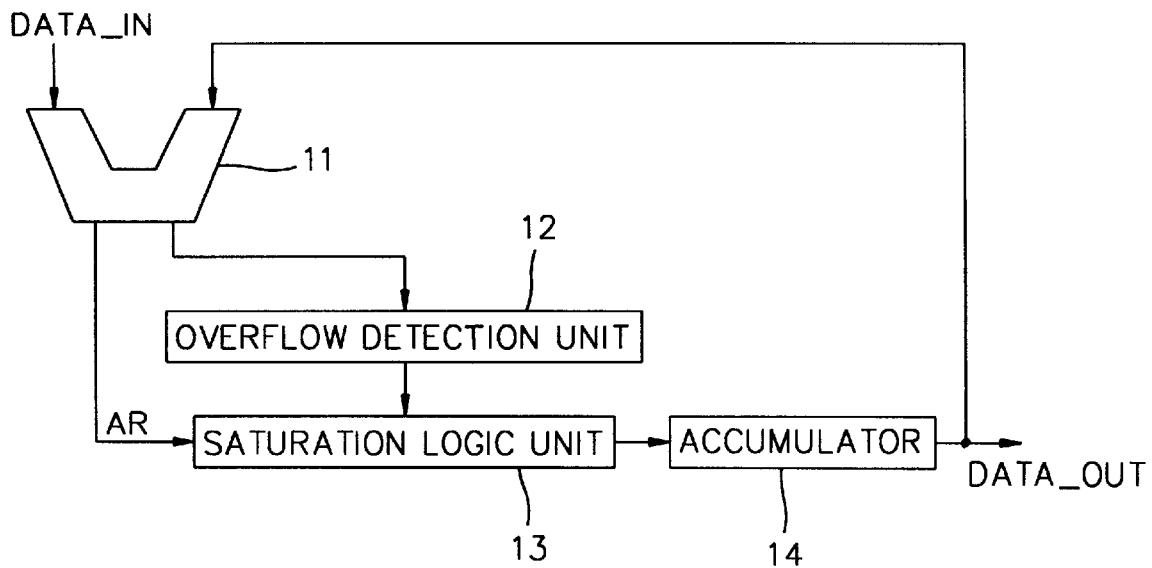
FIG. 1 is a block diagram of an arithmetic operating device for DSP according to the conventional art.
Figure 2:
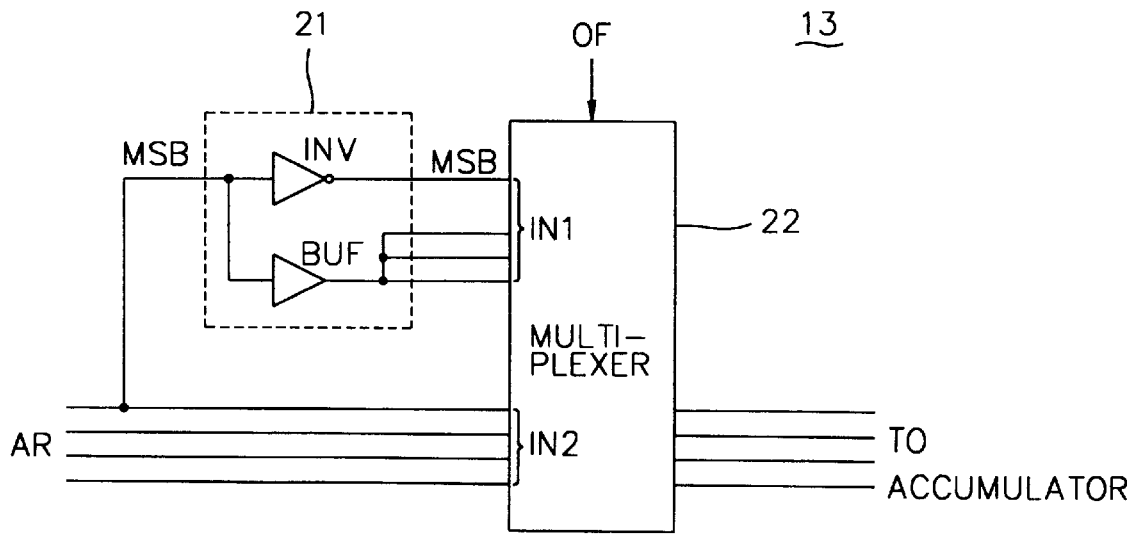
FIG. 2 is a circuit diagram detailing a saturation logic unit in the circuit of FIG. 1.
Figure 3:
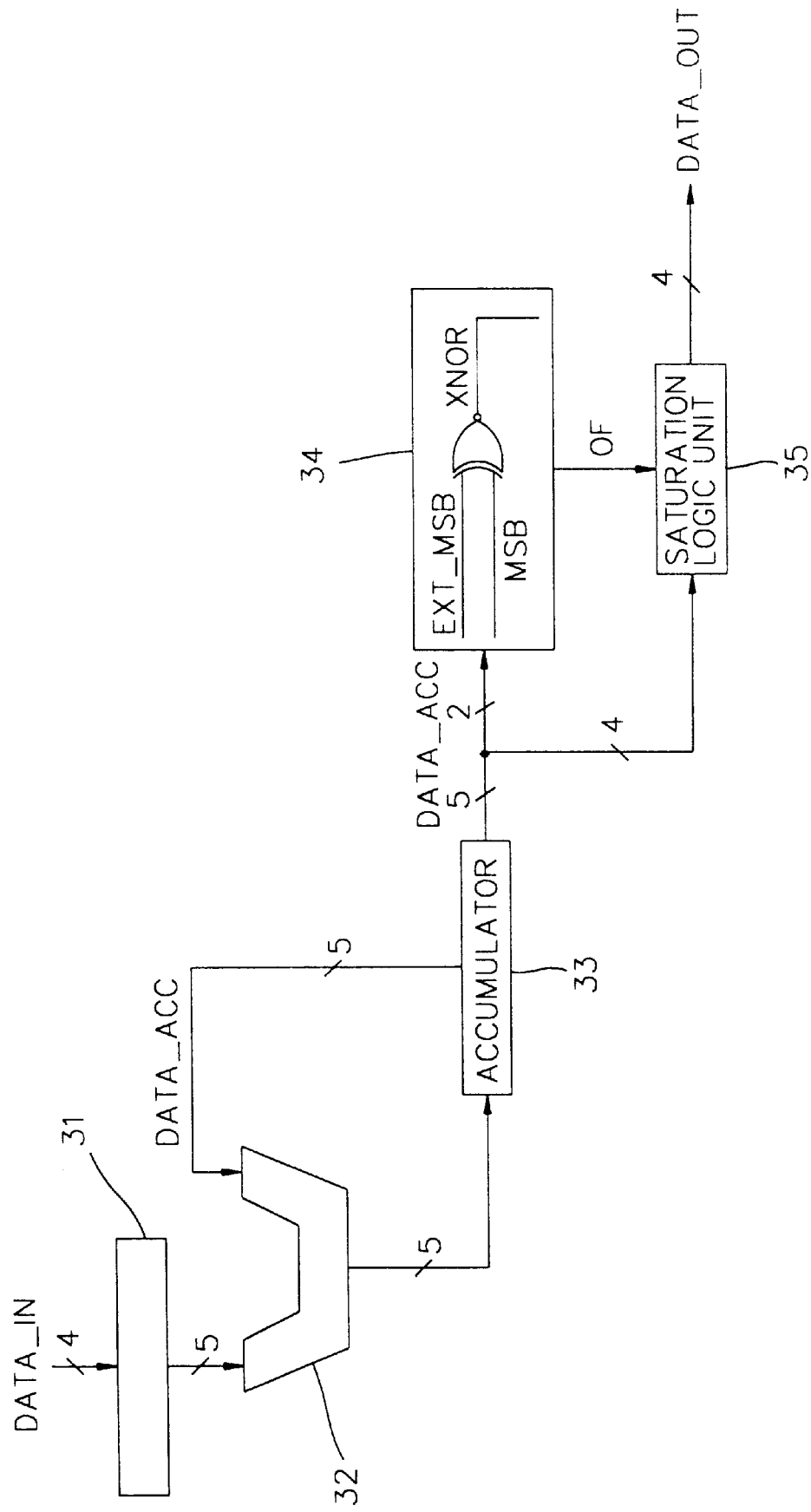
FIG. 3 is a block diagram of an arithmetic operating device for DSP according to the present invention.

With reference to FIG. 3 illustrating an arithmetic operating device for digital signal processing (DSP) according to the present invention, the arithmetic operating device includes: a sign bit extender 31 for increasing the number of sign bits with regard to an input data; an adder 32 for adding up a data DATA_IN outputted from the sign bit extender 31 and a feedback data DATA_ACC; an accumulator 33 for accumulating a present output data and a previous output data outputted from the adder 32 and outputting the accumulated data DATA_ACC; an overflow detector 34 including an exclusive NOR gate XNOR for outputting a control signal OF by determining whether respective bit values with regard to the extended sign bits in the output data DATA_ACC outputted from the accumulator 33; and a saturation logic unit 35 for converting the number of sign bits in the output data DATA_ACC from the accumulator 33 to an initial number of sign bits in the data DATA_IN, in accordance with the control signal OF.

The accumulator 33 outputs the data DATA_ACC to the adder 32 while an arithmetic operation is being performed therein, and it outputs the data DATA_ACC to the overflow detector 34 and the saturation logic unit 35 when the entire arithmetic operation is completed.

Figure 4:
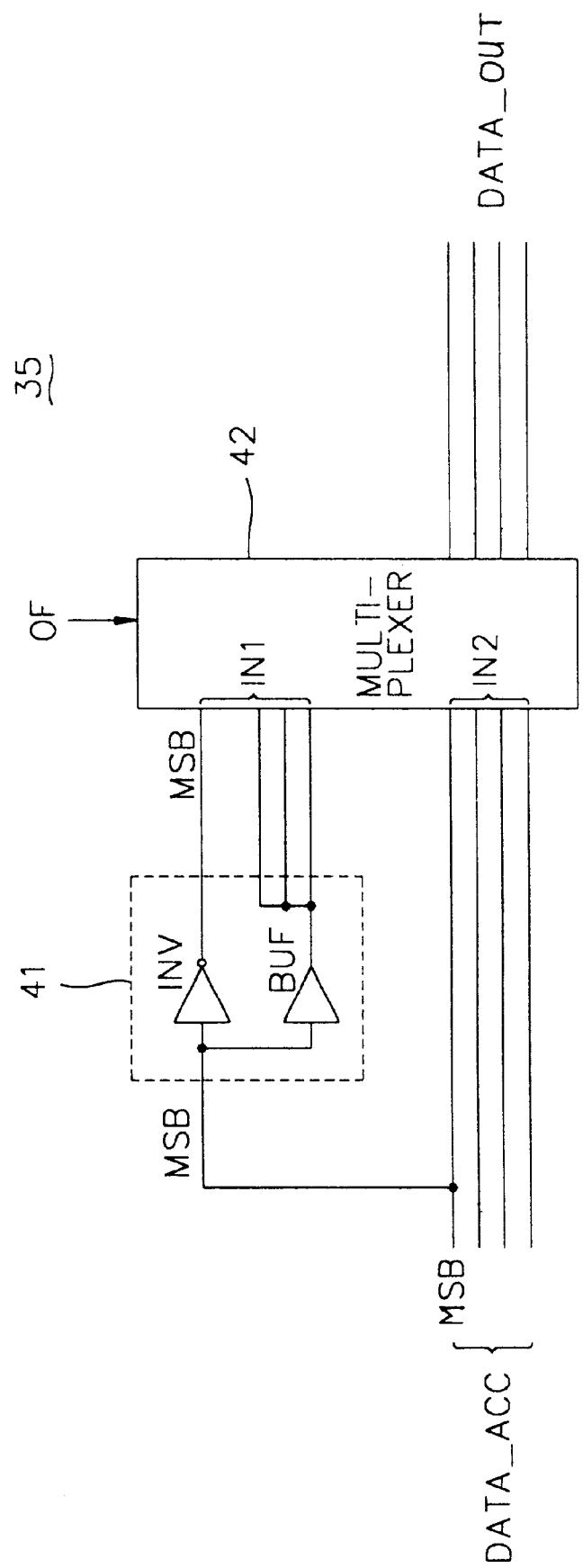
FIG. 4 is a circuit diagram detailing a saturation logic unit in the circuit of FIG. 3.

As shown in FIG. 4 detailing the saturation logic unit 35 in FIG. 3, the saturation logic unit 35 includes: a converter 41 having an inverter INV for inverting the most significant bit (MSB) in the output data DATA_ACC from the accumulator 33, and a buffer BUF for defining the remaining bits to be equal to the value of value except for the MSB; and a multiplexer 42 in which the data from the converter 41 are applied to a first input terminal IN1 and the data bits except for the extended sign bit in the output data DATA_ACC from the accumulator 33 are applied to a second input terminal IN2 for thereby selecting one of the two data in accordance with the output signal OF and outputting the selected data as a final output data DATA_OUT.

The operation of the thusly constituted arithmetic operating device according to the present invention will now be described.

Assuming that each of the input/output data DATA_IN, DATA_OUT are 4-bit data, the sign converter 31 checks the MSB of the 4-bit input data DATA_IN and extends a most significant bit therein to a value identical to the MSB. Here, it is assumed that there occurs one bit extension for convenience' sake.

When the input data DATA_IN is $0010_2$, the extended input data DATA_IN becomes 5 bits of $00010_2$, and the extended most significant bit EXT_MSB and the MSB become respectively "0".

The extended 5-bit input data $00010_2$, is added to a fed-back 5-bit data DATA_ACC in the adder 32.

The accumulator 33 accumulates the output data outputted from the adder 32 and the data calculated in the previous step and feeds back the data DATA_OUT to the adder 32.

The entire arithmetic operation is completed by repetition of the above-described steps, and the final resultant data is outputted to the overflow detector 34 and the saturation logic unit 35. Here, when the data DATA_ACC is 01001$_2$, the extended most significant bit EXT_MSB becomes "0" and the MSB becomes "1".

The overflow detector 34 determines that there does not occur an overflow in the case in which the bit value EXT_MSB in the data DATA_ACC and the MSB are identical to each other, and then the detector 34 outputs a high level signal OF. Also, in a case in which the bit value EXT_MSB in the data DATA_ACC and the MSB are not identical to each other, it is determined that an overflow has occurred, and the detector 34 outputs a low level control signal OF from the exclusive NOR gate XNOR. Here, logic devices other than the exclusive NOR gate XNOR may be employed to implement the overflow detector 34.

Because the extended MSB "0" EXT_MSB and the MSB "1" in the data DATA_ACC 01001$_2$ are different from each other, the output signal OF from the exclusive NOR gate XNOR becomes low level.

Meanwhile, the remaining 4-bit data "1001" except for the extended most significant bit EXT_MSB "0" in the data DATA_ACC is applied to the second input terminal IN2 of the multiplexer 42 in the saturation logic unit 35. Also, the converter 41 in the saturation logic unit 35 receives "1" as the MSB thereof.

The inverter INV in the converter 41 inverts the MSB "1" of the data DATA_ACC, and the buffer BUF receives the MSB "1", and outputs a bit value "1" of the MSB with regard to the remaining three bits except for the MSB, whereby the data applied to the first input terminal IN1 of the multiplexer 42 becomes "0111". That is, the converter 41 inverts the bit value of the MSB, and the remaining bits are determined in accordance with the MSB.

Because the output signal OF from the overflow detector 12 is in low level, the multiplexer 42 outputs the data "0111" applied thereto through the first input terminal IN1 as the output data DATA_OUT.

In the description above of the preferred embodiment of the present invention, there existed two sign bits due to an extension of the one sign bit; however, the number of sign bits may be further increased depending on the occasion, and the extended sign bit number is eliminated from the original sign bit in the saturation logic unit 35.

As described above, the converter 41 considers the possibility of an overflow generation and extends the number of sign bits in the data, and the arithmetic operation is carried out according to the extended data bit number, whereby it is not necessary to consider an overflow during the arithmetic operation.

Further, after completion of the accumulation, the saturation is only once carried out, so that the arithmetic operating device and method for a digital signal processing according to the present invention significantly decrease the time conventionally spent on buffering in the buffer BUF of the converter 21.

What is claimed is:

1. An arithmetic operating device for digital signal processing (DSP) employing a fixed number of bits for input/output, comprising:

a sign bit extender for increasing the number of sign bits of an input data DATA_IN;

an adder for adding the input data DATA_IN passed through the sign bit extender and a fed back data DATA_ACC to produce a sum;

an accumulator for accumulating said sum from the adder and for feeding an accumulated data DATA_ACC to the adder while an arithmetic operation is being performed therein;

an overflow detector for detecting an overflow of the data DATA_ACC outputted from the accumulator in accordance with the extended sign bits therein and outputting a signal OF as a detection result; and a saturation logic unit for converting the data DATA_ACC outputted from the accumulator to a maximum or minimum value representable as the DATA_OUT in accordance with the signal OF outputted from the overflow detector, wherein the accumulator outputs portions of the data DATA_ACC to the overflow detector and to the saturation logic unit when the entire arithmetic operation is completed.

2. The arithmetic operating device of claim 1, wherein respective bit values extended in the sign bit extender are identical to that of a most significant bit of the data applied thereto.

3. The arithmetic operating device of claim 1, wherein the overflow detector determines whether the value of extended sign bits in the data DATA_ACC outputted from the accumulator are all "0" or all "1"s.

4. The arithmetic operating device of claim 1, wherein the overflow detector is an exclusive NOR gate.

5. The arithmetic operating device of claim 1, wherein the saturation logic unit comprises:

a converter including an inverter for inverting a second most significant bit in the data DATA_ACC outputted from the accumulator, and a buffer for defining the remaining bit values as the value of the most significant bit; and switching means for outputting one selected from a data composed of the bits in the data DATA_ACC from the accumulator except for the sign bits extended in the data DATA_ACC, and a data value outputted from the converter, in accordance with the signal OF outputted form the overflow detector.

6. The arithmetic operating device of claim 5, wherein the switching means is a multiplexer.

7. An arithmetic operating method for digital signal processing (DSP) employing a fixed number of bits for input/output data, comprising:

increasing the number of sign bits of an input data DATA_IN;

adding the input data having extended sign bits and a fed back data DATA_ACC to produce a sum;

accumulating the sum;

determining whether there has occurred an overflow in accordance with a value of an extended sign bit in a final output data when the accumulating operation is completed;

eliminating the sign bits increased in the first step from the output data when there has not occurred an overflow; and saturating the output data when there has occurred an overflow.

8. The method of claim 7, wherein in the determining step, it is determined whether values of extended sign bits in the final output data are all "0"s or all "1"s.

9. The method of claim 7, wherein in the saturating step a most significant bit in the output data is inverted and values of the remaining bits therein are respectively defined as the value of the most significant bit.

* * * * *